(12) United States Patent
Morris (10) Patent No.: US 12,512,229 B2
(45) Date of Patent: Dec. 30, 2025

(54) THERMAL POWER REACTOR

(71) Applicant: SOLETANCHE FREYSSINET S.A.S., Rueil-Malmaison (FR)

(72) Inventor: Peter Morris, Warrington (GB)

(73) Assignee: SOLETANCHE FREYSSINET S.A.S., Rueil-Malmaison (FR)

( * ) Notice: Subject to any disclaimer, the term of this patent is extended or adjusted under 35 U.S.C. 154(b) by 0 days.

(21) Appl. No.: 17/756,553

(22) PCT Filed: Nov. 19, 2020

(86) PCT No.: PCT/EP2020/082719
§ 371 (c)(1),
(2) Date: May 26, 2022

(87) PCT Pub. No.: WO2021/104994
PCT Pub. Date: Jun. 3, 2021

(65) Prior Publication Data
US 2022/0399135 A1  Dec. 15, 2022

(30) Foreign Application Priority Data

Nov. 27, 2019 (GB) ...................................... 1917275

(51) Int. Cl.
*G21C 15/04* (2006.01)
*G21D 5/02* (2006.01)
(Continued)

(52) U.S. Cl.
CPC ............... *G21C 15/04* (2013.01); *G21D 5/02* (2013.01); *G21D 7/04* (2013.01); *B64G 1/422* (2013.01)

(58) Field of Classification Search
CPC .. G21D 7/04; G21D 7/00; G21D 5/02; G21D 5/08; B64G 1/422; F28F 21/02;
(Continued)

(56) References Cited

U.S. PATENT DOCUMENTS 3,243,613 A * 3/1966 Grover ..................... G21D 7/04
976/DIG. 204
3,276,914 A   10/1966 Shoupp
(Continued)

FOREIGN PATENT DOCUMENTS

CN  105626405     * 10/2018 ............. Y02E 10/46
CN  105626405 B    10/2018
(Continued)

OTHER PUBLICATIONS

International Search Report and Written Opinion of International Application No. PCT/EP2020/082719, mailed Feb. 15, 2021.
(Continued)

*Primary Examiner* — Sharon M Davis
(74) *Attorney, Agent, or Firm* — Heslin Rothenberg Farley Mesiti P.C.; George S. Blasiak, Esq.

(57) ABSTRACT

A thermal power reactor (100) includes a reactor core (102) that generates thermal energy and a solid state thermal conductor (106) extending into and thermally integrated with the reactor core (102). The solid state thermal conductor (106) transfers thermal energy generated by the reactor core (102) away from the reactor core (102).

18 Claims, 5 Drawing Sheets

(51) Int. Cl.
    *G21D 7/04* (2006.01)
    *B64G 1/42* (2006.01)
(58) Field of Classification Search
    CPC ..... F28F 2013/001; G21C 3/40; G21C 15/02; G21C 15/04; G21C 15/10
    See application file for complete search history.

(56) References Cited

U.S. PATENT DOCUMENTS

| | | | | |
|---|---|---|---|---|
| 3,451,641 | A | * | 6/1969 | Leventhal ............... G21D 7/04 136/202 |
| 3,931,532 | A | * | 1/1976 | Byrd ....................... G21D 7/04 136/202 |
| 4,313,795 | A | | 2/1982 | Dauvergne |
| 6,365,822 | B1 | * | 4/2002 | Dobry, Jr. ............... G21D 5/02 136/202 |
| 2016/0012924 | A1 | * | 1/2016 | McClure .................. G21C 3/04 376/347 |
| 2018/0033501 | A1 | * | 2/2018 | Kimura ................... G21C 3/22 |
| 2019/0016482 | A1 | * | 1/2019 | Benthem ................. B64G 1/58 |
| 2019/0062921 | A1 | * | 2/2019 | Adams .................. C01B 32/186 |
| 2021/0125737 | A1 | * | 4/2021 | Botha .................. F28D 15/0275 |
| 2022/0148745 | A1 | * | 5/2022 | Yoshida ................. G21C 15/08 |
| 2022/0399135 | A1 | | 12/2022 | Morris |

FOREIGN PATENT DOCUMENTS

| | | |
|---|---|---|
| CN | 109859859 | 6/2019 |
| CN | 109859861 | 6/2019 |
| CN | 109887618 | 6/2019 |
| CN | 110853786 | 2/2020 |
| CN | 111403059 A | 7/2020 |
| JP | 2002303691 | 10/2002 |
| JP | 2014119429 | 6/2014 |
| KR | 101482018 | 1/2015 |
| WO | WO 2020/202806 A1 | 10/2020 |

OTHER PUBLICATIONS

International Search Report and Written Opinion of PCT/EP2022/063938, mailed Sep. 9, 2022, 13 pages.
Search Report from the Intellectual Property Office for United Kingdom Application No. 2107508.0, mailed on Feb. 17, 2022, 5 pages.
Electronic Acknowledge Receipt for commonly assigned U.S. National Stage application.
Innovation, Science and Economic Development Canada Examination issued in CA Application No. 3,159, 131, dated Oct. 25, 2024, 4 pages.
European Patent Office Examination issued in EU Application No. 20810948.8-1211, dated Oct. 16, 2024, 4 pages.

* cited by examiner

THERMAL POWER REACTOR

CROSS REFERENCE TO RELATED APPLICATIONS

This application is a national stage filing under section 371 of International Application No. PCT/EP2020/082719 filed on Nov. 19, 2020, and published on Jun. 3, 2021 as WO2021/104994 A1, which claims priority to Great Britain Application No. 1917275.8 filed on Nov. 27, 2019. The entire contents of WO2021/104994 A1 are hereby incorporated herein by reference.

This invention relates to a thermal power reactor, in particular a thermal power reactor for use in a spacecraft.

Nuclear fission reactors are able to generate a large amount of energy relative to the mass of the fissile material, e.g. uranium-235 or uranium-238, used in the reactor. While many nuclear fission reactors supply power for civilian consumer use, nuclear fission reactors have been considered potential power sources for use in space, e.g. to power spacecraft or space probes.

An example of a nuclear fission reactor system designed for use in spacecraft is the Kilopower Reactor Using Stirling Technology (KRUSTY) developed by NASA. KRUSTY is a compact, fast reactor which uses a "heatpipe" heat transport system in which sodium is used as a liquid coolant.

Liquid coolant systems, in fission reactor systems developed for use in space, may present a number of potential weaknesses in the system. The requirement for coolant pipes through which a liquid reliably flows may result in a complicated reactor design with a large amount of pipe work and the potential for leakage of the liquid coolant. For space exploration, simpler designs are often favourable because complicated designs may create more failure modes that could result in catastrophic consequences on a mission. Reducing the number of moving parts (such as a flowing coolant, or components required to produce coolant flow) may also be desirable for space applications, as moving parts may add further potential failure modes in a reactor that may not be able to be rectified once the spacecraft has been launched.

A liquid coolant may itself provide a number of possible failure modes for the reactor: loss of coolant flow (which results in the reactor failing to be cooled and prevents it's prime function of heat transfer from taking place) and loss of coolant (which stops the reactor functioning and may pose the risk of an exothermic reaction of the liquid coolant with external materials (e.g. sodium and water)). All of these are undesirable in a reactor designed for use in space.

An aim of the present application is to provide an improved thermal power reactor, e.g. better suited to implementation in a spacecraft or for other space related functions.

When viewed from a first aspect, the present invention provides a thermal power reactor comprising:
 a reactor core arranged to generate thermal energy; and
 a solid state thermal conductor extending into and thermally integrated with the reactor core, wherein the solid state thermal conductor is arranged to transfer thermal energy generated by the reactor core away from the reactor core.

The present invention relates to a thermal power reactor, in which (e.g. fission) reactions take place to generate thermal energy. A solid state thermal conductor is in contact with the reactor core such that the thermal energy produced in the reactor can be transferred out of the reactor core via the solid state thermal conductor. The solid state thermal conductor is thus able to transfer the thermal energy from the core.

The skilled person will appreciate that the provision of a solid state thermal conductor in a thermal (e.g. fission) power reactor helps to provide a better alternative to a liquid coolant system for transferring thermal energy away from the reactor core. Using a solid state thermal conductor may remove the need for moving parts in the cooling system. This helps to improve the reliability of the thermal power reactor, which is particularly important for applications such as space exploration. Removing the liquid coolant system helps to remove the following potential failure modes of the thermal power reactor: loss of coolant and loss of coolant flow. Removing the need for moving parts may reduce the maintenance requirements of the thermal power reactor (e.g. may help to produce a thermal reactor with no maintenance requirements).

In a set of embodiments, the solid state thermal conductor is arranged to transfer thermal energy generated by the reactor core away from the reactor core for subsequent use, e.g. for heating a remote device. For example, the solid state thermal conductor transfers the thermal energy from the core to a device (e.g. a heat conversion unit) for converting thermal energy to electricity. In a set of embodiments, the solid state thermal conductor is arranged to transfer thermal energy generated by the reactor core away from the reactor core for use in converting into electricity. It will be appreciated that by converting the thermal energy into electricity, this electricity can be used, e.g., to power systems on board a spacecraft.

In a set of embodiments the reactor core comprises a nuclear fission reactor core. In other embodiments, the reactor core may comprise the reactor core of a nuclear fusion (or other thermal) reactor. Using a solid state thermal conductor may help to reduce the number of failure modes of these types of reactor. It will be appreciated that failure of a nuclear fission reactor can have catastrophic consequences (e.g. owing to the potential discharge of radioactive material), and thus reducing the risk of failure is important.

The solid state thermal conductor may transfer the thermal energy generated in the reactor core, from the reactor core, in any suitable and desired way. In a set of embodiments, the solid state thermal conductor comprises an internal portion extending into the thermal reactor core and an external portion extending away from the reactor core. Preferably the internal portion and the external portion of the solid state thermal conductor are thermally connected to (e.g. in good thermal contact with) each other. This helps to transfer the thermal energy generated in the reactor core to a device for converting the thermal energy, e.g. into electricity.

The internal portion and the external portion of the solid state thermal conductor may be arranged in any suitable and desired way. In one embodiment the internal portion and the external portion are formed from different materials. This may enable materials for the internal and external portions of the solid state thermal conductor to be chosen that have properties which are suitable for the different requirements inside and outside of the reactor core. However, in other embodiments, the same material may be used for both the internal and external portions of the solid state thermal conductor.

In a set of embodiments the (e.g. internal portion of the) solid state thermal conductor comprises graphite or a (e.g. high conductivity, high strength) metal alloy, e.g. tungsten-rhenium. Both of these materials help to facilitate an efficient transfer of the generated thermal energy out of the reactor core, e.g. to the external portion of the solid state thermal conductor. Such materials are also able to be formed into suitable structures for forming inside a reactor core and have a good structural integrity against the high temperatures generated in a thermal power reactor core.

In a set of embodiments, the internal portion of the solid state thermal conductor comprises a mesh extending within the reactor core. The fuel of the reactor core may enclose at least part of the mesh. For example, a metallic alloy fuel may be moulded around the mesh. An example of a suitable combination may be a uranium-tungsten or uranium-rhenium fuel encasing a tungsten-rhenium alloy mesh. A mesh helps to increase the surface area of the solid state thermal conductor exposed to the thermal energy generated in the reactor core, which helps to increase the amount of thermal energy able to be extracted from the reactor core.

Preferably the (e.g. mesh of the) internal portion of the solid state thermal conductor has a high thermal conductivity and a high melting point. This helps both to transfer thermal energy from the reactor core and to prevent the solid state thermal conductor melting when the reactor core is generating thermal energy, e.g. when the fuel of the reactor core encloses the mesh.

In a set of embodiments, the internal portion of the solid state thermal conductor comprises a plurality of layers, e.g. a plurality of sheet layers. This helps to increase the surface area of the solid state thermal conductor exposed to the thermal energy generated in the reactor core, which helps to increase the amount of thermal energy able to be extracted from the reactor core.

Providing a solid state thermal conductor comprising a plurality of layers may be suitable for a reactor core comprising compact type fuel cores, e.g. formed from discrete compact, particulate filled fuel discs. The plurality of layers may then be positioned in between the discrete compact fuel discs, e.g. such that the plurality of layers interleave the discrete compact fuel discs. The plurality of layers may be formed from graphite or a high conductivity metal alloy such a tungsten-rhenium. In one embodiment the fuels discs comprise enriched tristructural-isotropic (TRISO) fuel particles. TRISO fuels have high melting points and thus are suitable for use in compact type fuel cores which function at particularly high temperatures. TRISO fuels also have negative reactivity feedback mechanisms (such as expansion and contraction) and thus support autonomous control (e.g. human intervention to control the fission reaction is not required), which is particularly suitable for reactors designed for use in space (e.g. in spacecraft).

In a set of embodiments, the (e.g. external portion of the) solid state thermal conductor comprises graphene. Graphene may be particularly suitable owing to its high thermal conductivity. It will be appreciated that the high thermal conductivity of graphene is much greater than that of liquid sodium, for example, the latter of which has a measured thermal conductivity of approximately 80 $Wm^{-1} K^{-1}$.

In a preferred embodiment the solid state thermal conductor (e.g. when the solid state thermal conductor comprises graphene) is arranged to have a thermal conductivity greater than 2000 $Wm^{-1} K^{-1}$, e.g. greater than 3000 $Wm^{-1} K^{-1}$, e.g. greater than 4000 $Wm^{-1} K^{-1}$, e.g. greater than 5000 $Wm^{-1} K^{-1}$. This helps to transfer heat effectively from the reactor core, owing to the high thermal conductivity of the solid state thermal conductor.

In a set of embodiments, the external portion of the solid state thermal conductor comprises multiple layers of graphene. Graphene is formed from a two-dimensional hexagonal lattice of carbon atoms. Thus, multiple layers of the two-dimensional lattice may be used to form a solid state thermal conductor of adequate volume to conduct a suitable amount of thermal energy away from the reactor core, e.g. for generating electricity.

In a set of embodiments, the external portion of the solid state thermal conductor comprises one or more intermediate separating layers arranged to interleave the multiple layers of graphene. The intermediate separating layers help to separate the layers of graphene such that the layers of graphene do not come into direct contact with each other. This helps to maintain the heat conducting properties of each, e.g. single sheet, layer of graphene.

The intermediate separating layers may be formed from any suitable and desirable material. In a set of embodiments the separating layers comprise copper. Using copper to prevent the graphene layers from contacting each other helps to reduce the effect of the quantum mechanical properties, and therefore conductivity, of the individual sheets on each other.

In one embodiment the external portion of the solid state thermal conductor comprises an outer insulating layer, e.g. formed from gold foil. This helps to further insulate the (e.g. graphene layers of the) external portion of the solid state thermal conductor.

In a set of embodiments, the graphene of the solid state thermal conductor comprises graphene ribbons. Graphene ribbons are typically strips of graphene, e.g. with a thickness of less than about 50 nm. Graphene ribbons help to provide a continuous sheet of graphene over an extended length, with a high thermal conductivity, such that an efficient elongate solid state thermal conductor may be provided.

The internal and external portions of the solid state thermal conductor may be connected to each other in any suitable and desired way. When the internal and external portions of the solid state thermal conductor comprise the same material, the internal and external portions of the solid state thermal conductor may be continuous extensions of each other. When the internal and external portions of the solid state thermal conductor are formed from different materials, the internal portion (e.g. formed from graphite or a metal alloy) and the external portion (e.g. formed from graphene) may be connected together by an adhesive or mechanical fastener, which helps to ensure a good (surface area) contact between the internal and external portions.

In one set of embodiments, the thermal power reactor comprises a heat conversion unit for converting thermal energy to electricity. This allows the thermal energy generated in the reactor core to be converted into electricity. Preferably the heat conversion unit is thermally connected to the reactor core via the solid state thermal conductor (e.g. the solid state thermal conductor is thermally connected to the heat conversion unit). Thus the energy is transferred from the reactor core to the heat conversion unit by the solid state thermal conductor. In a set of embodiments, the external portion of the solid state thermal conductor is connected to the heat conversion unit.

In a set of embodiments, the heat conversion comprises a solid state heat conversion unit, e.g. a thermoelectric generator. For reactors intended for use in space, using a solid state heat conversion unit to convert heat energy produced in the reactor core to electrical energy helps to reduce the number of moving parts (e.g. to zero). Moving parts are more susceptible to failure and are difficult (if not impossible) to fix should they fail in a commissioned spacecraft.

In another set of embodiments, the heat conversion unit comprises a Stirling engine. A Stirling engine converts heat energy to kinetic energy (and then, e.g., electricity) by the expansion and compression of working gases in the Stirling engine. Stirling engines may be more efficient mechanisms for converting heat energy from the thermal reactor core in larger scale thermal reactors, especially for nuclear fission reaction intended for supplying commercial power, where a larger amount of heat energy is produced at any given time and reducing moving parts is a less important consideration (compared with a reactor intended for use in space exploration).

In a set of embodiments, the solid state thermal conductor comprises a portion that extends into the heat conversion unit, for transferring thermal energy into the heat conversion unit. Preferably, the external portion of the solid state thermal conductor extends into the heat conversion unit. This portion of the solid state thermal conductor may be formed from graphene, or may be formed from graphite or a highly conductive metal alloy. The portion of the solid state thermal conductor that extends into the heat conversion unit is preferably in good thermal contact with the heat conversion unit. This aids thermal energy to be transferred from the solid state thermal conductor to the heat conversion unit.

In embodiments in which the heat conversion unit comprises a solid state heat conversion unit, the portion of the solid state thermal conductor that extends into the solid state heat conversion unit is arranged to transfer thermal energy to the solid state heat conversion unit, for converting the thermal energy into electricity. The solid state heat conversion unit may then output electrical energy.

In embodiments in which the heat conversion unit comprises a solid state heat conversion unit, preferably the solid state heat conversion unit is positioned in contact with (e.g. a reflective shield of) the reactor core, as will be discussed further below. Thus the solid state thermal conductor may comprise an internal portion that extends into the reactor core and an external portion that extends into the solid state heat conversion unit, e.g. with no intermediate portion.

In embodiments in which the heat conversion unit comprises a Stirling engine, the portion of the solid state thermal conductor that extends into the Stirling engine is arranged to transfer thermal energy to a working fluid, e.g. the solid state thermal conductor extends into the "hot end" of the Stirling engine. Transferring thermal energy to the working fluid (e.g. a gas) of the Stirling energy results in the working fluid expanding. The expansion of the working fluid may then drive a piston, e.g. to generate kinetic energy for converting into electricity.

In a set of embodiments in which the external portion of the solid state thermal conductor comprises (e.g. multiple layers of) graphene, the (e.g. layers of) graphene may be wrapped around the (e.g. hot end of the) Stirling engine. This helps to provide efficient transfer of thermal energy from the external portion of the solid state thermal conductor to the working fluid of the Stirling engine.

In embodiments in which the heat conversion unit comprises a Stirling engine, preferably the Stirling engine is remote from (i.e. not in contact with) the reactor core. Thus the external portion of the solid state thermal conductor preferably extends between the reactor core and the Stirling engine (and preferably extends into the Stirling engine). Preferably the solid state thermal conductor (e.g. the intermediate part of the external portion that extends between the reactor core and the Stirling engine) is elongate (i.e. has a length greater than a width and a depth).

When using certain fuels in the reactor core that comprise or produce contaminating materials (e.g. by-products), preferably the reactor core is arranged to contain these contaminating materials in the reactor core. For example, when the reactor core comprises a nuclear fission reactor core, preferably the reactor core is arranged to substantially prevent neutrons and other radiation produced in the fission reaction from leaving the reactor core. Therefore, in a set of embodiments, the thermal power reactor comprises a (e.g. reflective) shield. The shield may be formed from a metal or metal composite. Preferably the shield encases the reactor core. The shield helps to reduce the amount of contaminating materials that escape from the reactor core. For example, the shield may absorb and/or reflect neutrons produced in fission reaction in the reactor core.

In a set of embodiments the solid state thermal conductor penetrates (extends through) the shield. This helps to transfer thermal energy away from a reactor core encased in a shield. Preferably, the solid state thermal conductor fully penetrates the shield such that the solid state thermal conductor is in direct (thermal) contact with the reactor core.

Preferably, when the heat conversion unit comprises a solid state heat conversion unit, the solid state heat conversion unit is located at (e.g. on an external wall of) the shield of the reactor core. This helps to reduce any heat losses that may otherwise occur between the solid state heat conversion unit and reactor core.

The Applicant has appreciated that in embodiments in which the solid state thermal conductor penetrates the shield, this may form a route along which radiation and/or contaminating materials may escape from the reactor core through the shield via the solid state thermal conductor. In a set of embodiments, the solid state thermal conductor comprises a non-linear portion extending through the shield. The non-linear portion may, for example, comprise an S-shaped, a U-shaped bend or a labyrinthine path. The non-linear portion (which is preferably located within the shield of the reactor core) helps to reduce any radiation and/or contaminating material from escaping through the shield as the non-linear portion prevents a linear route through the solid state thermal conductor along which the contaminating materials may escape.

Certain embodiments of the present invention will now be described, by way of example only, with reference to the accompanying drawings in which.

Various embodiments of a thermal power reactor will now be described. The thermal power reactors shown may be suitable for use in space, e.g. to act as a power source for a spacecraft or space probe, or on a surface landing mission.

Figure 1:
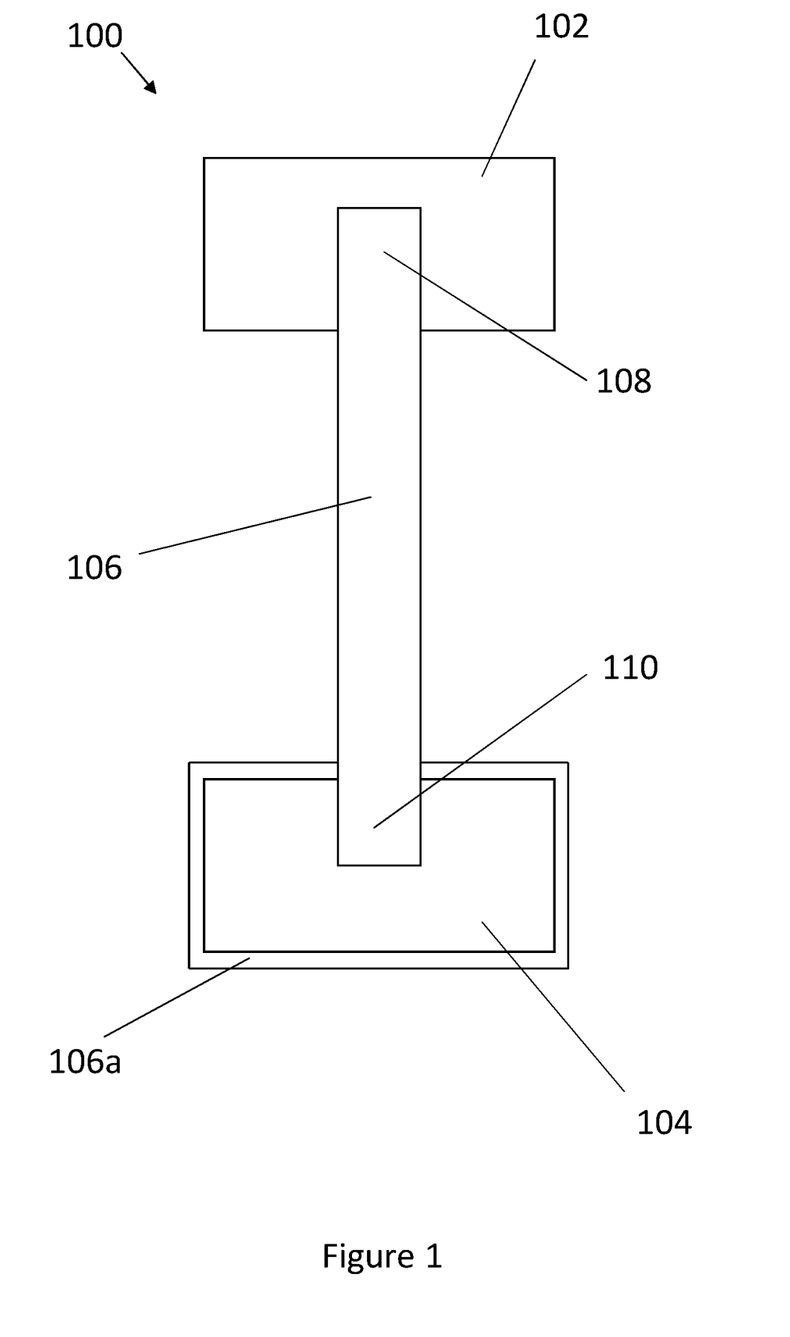
FIG. 1 shows schematically a thermal power reactor according to an embodiment of the present invention.

FIG. 1 shows schematically a thermal power reactor 100 in accordance with an embodiment of the present invention. The thermal power reactor 100 may be a nuclear fusion reactor used for commercial power generation. In such examples, the thermal power reactor 100 may be large scale, capable of producing a commercially beneficial power output. The thermal power reactor 100 may also be a nuclear fusion reactor implemented in a spacecraft or a space probe. In such examples, the thermal power reactor 100 may be a compact, small reactor providing the small amount of power required by the spacecraft. It will also be appreciated by a person skilled in the art that the thermal power reactor 100 may be a nuclear fusion reactor or furnace, e.g. for burning coal.

The thermal power reactor 100 comprises a reactor core 102. The type of reactor core 102 used corresponds to the type of thermal power reactor 100. For example, when the thermal power reactor 100 is a nuclear fission reactor, the reactor core 102 is a nuclear fission core. The reactor core 102 further comprises a fuel (not shown in FIG. 1) for generating thermal energy. In the example of a nuclear fission reactor, the fuel may contain nuclear isotopes (e.g. uraninum-235, plutonium-239 and/or uranium-238) that are used in fission reactions to generate thermal energy. The fuel may be a mixture of such nuclear isotopes depending on the requirements of the thermal power reactor 100.

The thermal power reactor 100 further comprises a heat conversion unit 104. The heat conversion unit 104 may, for example, be a thermoelectric generator or a Stirling engine. The heat conversion unit 104 converts thermal energy produced in the reactor core 102 to another form of energy, which may be more suitable for particular applications. For example, the heat conversion unit 100 may convert the thermal energy into kinetic energy (e.g. when the heat conversion unit 100 comprises a Stirling engine). This kinetic energy may be used to drive a turbine to be converted into electrical energy. The heat conversion unit 100 may also convert the thermal energy directly into electrical energy (e.g. when the heat conversion unit 100 comprises a thermoelectric generator).

In order for thermal energy to be transferred from the reactor core 102 to the heat conversion unit 104, the reactor core 102 and the heat conversion unit 104 must be thermally connected such that thermal energy can flow between them. This thermal connection is provided by the solid state thermal conductor 106 that is arranged between, and in good thermal contact with, the reactor core 102 and the heat conversion unit 104.

The solid state thermal conductor 106 is formed at least partially from graphene, e.g. in the section extending between the reactor core 102 and the heat conversion unit 104. This may be seen in embodiments in which the heat conversion unit is located at some distance from the reactor core. In this section, the solid state thermal conductor 106 comprises multiple layers of graphene ribbons 106a. The multiple layers of graphene ribbons 106a are interleaved by multiple layers of copper separating the layers of graphene 106a and covered in an outer layer of gold foil. When the heat conversion unit 104 comprises a Stirling engine, the layers of graphene 106a are wrapped around the hot end of the Stirling engine to transfer heat generated in the reactor core 102 into the working fluid of the Stirling engine.

Figure 2:
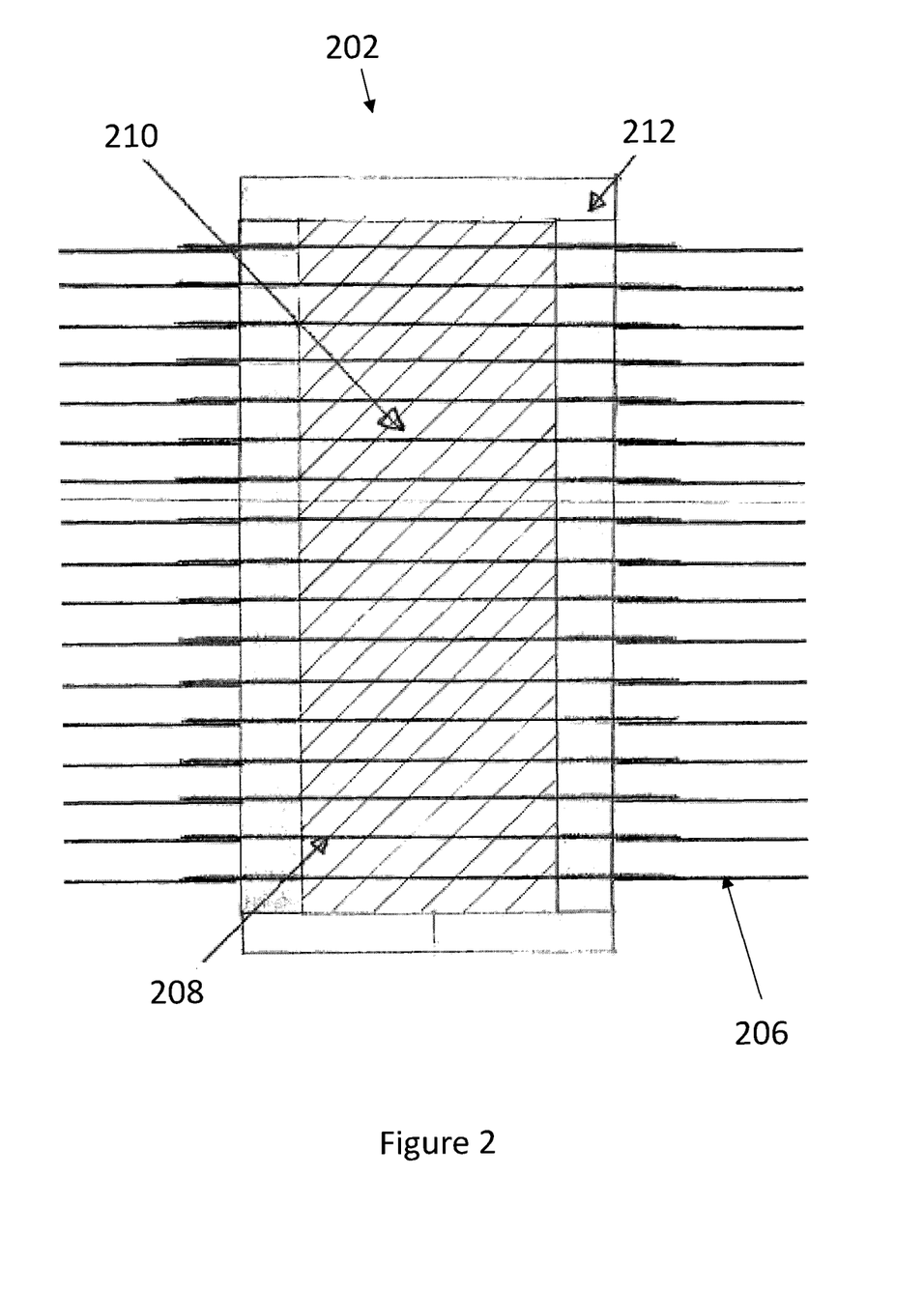
FIGS. 2 and 3 show cross-sections of a reactor core for use with a thermal power reactor according to an embodiment of the present invention.
Figure 3:
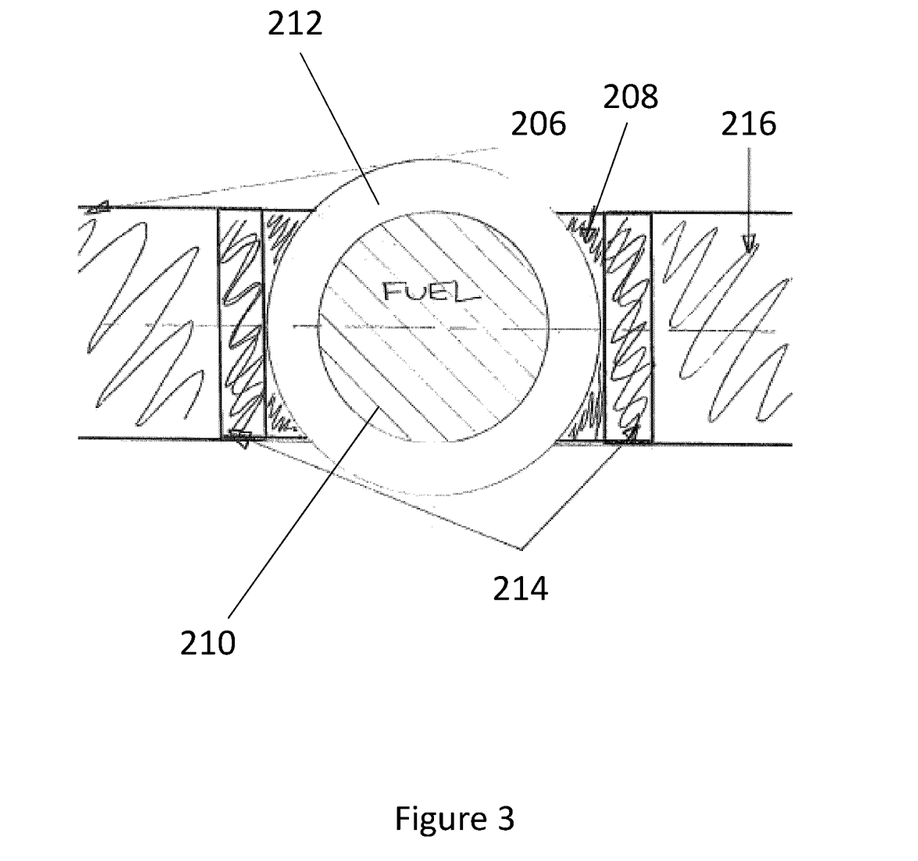
Figure 5:
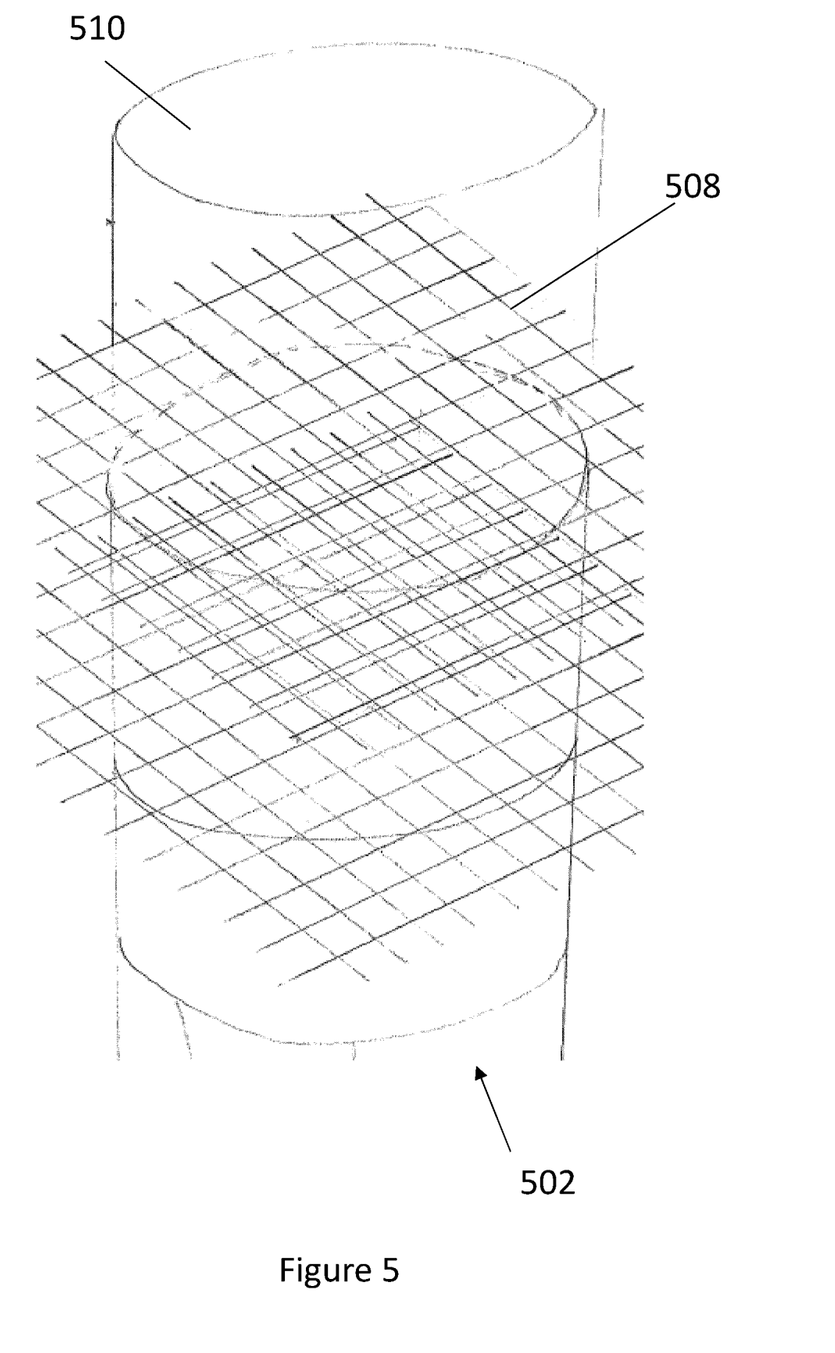
FIG. 5 shows schematically a reactor core for use with a thermal power reactor according to an embodiment of the present invention.

To transfer thermal energy between the reactor core 102 and the heat conversion unit 104, the solid state thermal conductor 106 is in thermal contact with both. In the embodiment shown in FIG. 1, the solid state thermal conductor 106 has an internal portion 108 which extends into the reactor core 102. Exemplary arrangements of the internal portion 108 of the solid state thermal conductor 106 and the reactor core 102 are shown in FIGS. 2, 3 and 5. In the embodiment shown in FIG. 1, the solid state thermal conductor has an external portion 110 which extends into the heat conversion unit 104. Both or one of the portions 108, 110 may be formed from graphene, or may be formed from a high conductivity metal alloy.

FIG. 2 shows a cross-section of a reactor core for use with a thermal power reactor according to an embodiment of the present invention. FIG. 2 shows an exemplary arrangement of the internal portion 208 of a solid state thermal conductor 206 within a reactor core 202. In the arrangement shown in FIG. 2, the reactor core 202 contains a plurality of (e.g. TRISO packed, prismatic graphite) fuel discs 210. The fission reactions that generate thermal energy occur within the fuel discs 210.

The internal portion 208 of the solid state thermal conductor 206 comprises multiple sheets, e.g. of graphite or metal (e.g. tungsten-rhenium) alloy. A sheet is placed between each fuel disc 210. The fuel discs 210 are stacked in a manner such as to form a cylinder of discs, with each disc 210 being separated from the adjacent disc 210 in the cylinder by a sheet of the internal portion 208 of the solid state thermal conductor 206. Each sheet conducts thermal energy produced in the fuel discs out of the reactor core 202, and into the remainder of the solid state thermal conductor 206. FIG. 3 shows a different cross-section of the reactor core 202 shown in FIG. 2, showing the solid state thermal conductor 206.

In both FIGS. 2 and 3, a reflecting shield 212 is shown encasing the fuel discs 210 in the reactor core 202. The shield 212 helps to contain (by reflecting or absorbing) contaminating (e.g. radioactive) materials that are produced by the reactions in the reactor core 202. The shield 212 is manufactured from steel, or formed from a combination of layers of different materials.

The solid state thermal conductor 206 extends through the shield 212. As shown in FIG. 3, the internal portion 208 of the solid state thermal conductor 206 extends through the shield 212 and is connected to an external portion 216 of the extends through the shield 212 by a thermally conductive coupling 214.

Figure 4:
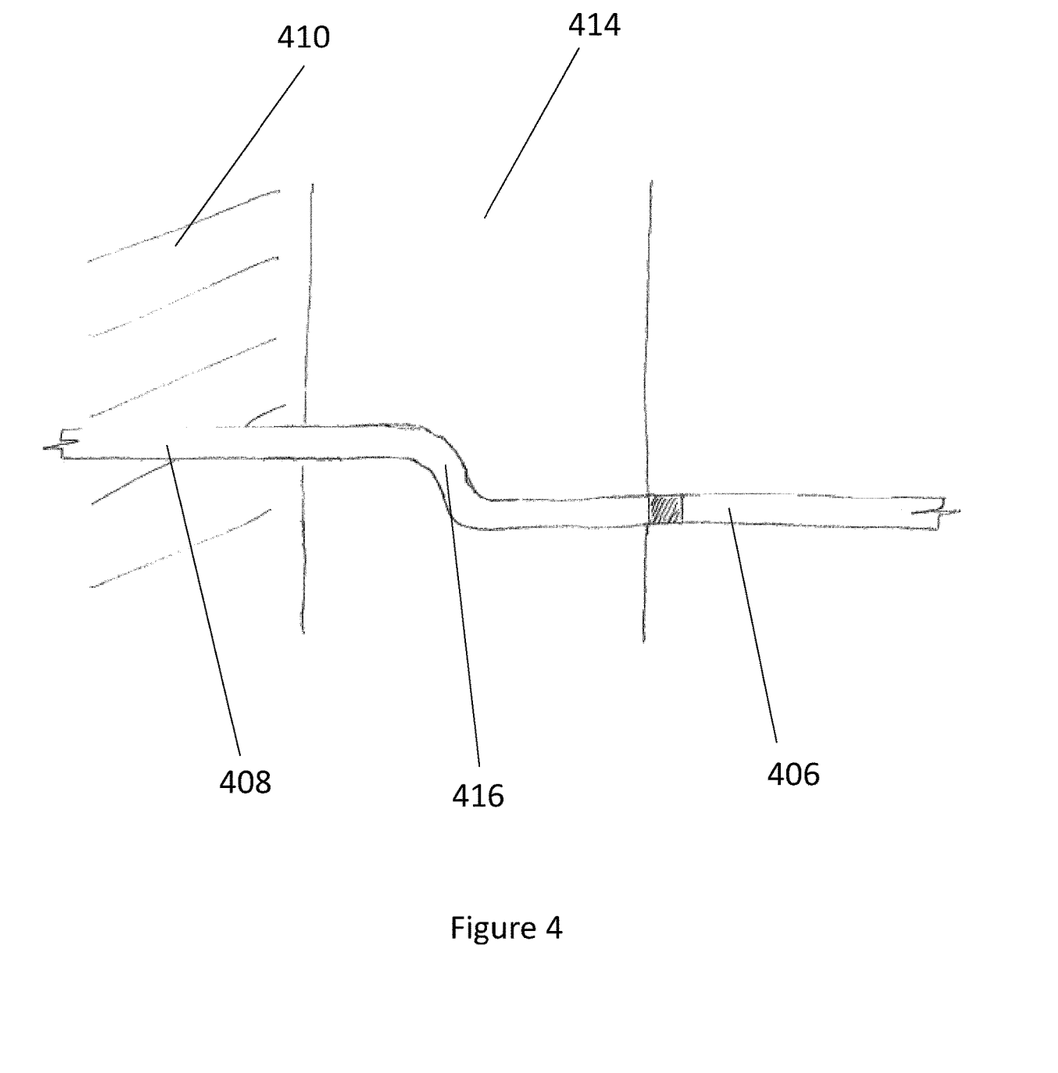
FIG. 4 shows a cross-section through the wall of a reactor core for use with a thermal power reactor according to an embodiment of the present invention.

It will be appreciated that in the embodiment shown in FIGS. 2 and 3, the internal portion 208 of the solid state thermal conductor 206 extending through the shield 212 may form a path through the shield 212 through which contaminating materials can escape the from the reactor core 202. FIG. 4 demonstrates a solution to this problem.

FIG. 4 shows a cross-section through the wall of a reactor core for use with a thermal power reactor according to an embodiment of the present invention. FIG. 4 shows a section of the reactor core 410 and a reflecting shield 414 surrounding the reactor core 410. The internal portion 408 of the solid state thermal conductor 406 penetrates out from the reactor core 410 and through the shield 414. The section of the solid state thermal conductor 406 passing through the shield 414 comprises an S-bend 416. The bend 416 results in the solid state thermal conductor 406 having a non-linear path through the shield 414. This decreases the risk of harmful contaminants escaping from the reactor core 410 through the shield 414, as there is no linear route through the solid state thermal conductor 406 along which any contaminating materials (e.g. radioactive particles) could pass without interacting with the shield 414 (which may reflect or absorb them).

FIG. 5 shows schematically a reactor core 502 for use with a thermal power reactor according to another embodiment of the present invention. In this embodiment, the internal portion 508 of the solid state thermal conductor is arranged as a mesh, e.g. formed from graphite or a metal (e.g. tungsten-rhenium) alloy. The fuel 510 of the reactor core 502 (e.g. in the form of a metallic alloy fuel) is moulded around the mesh.

It will be seen from the above that in at least preferred embodiments a thermal power reactor is provided in which heat is transported away from the reactor core by a solid state thermal conductor, e.g. comprising graphene. This helps to reduce or eliminate the need for a fluid coolant which has the associated risks of moving parts and failure owing to fluid leakage. Thus embodiments of the thermal power reactor may be suitable for use in space.

The invention claimed is:

1. A thermal power reactor comprising:
   a reactor core, wherein the reactor core comprises a plurality of fuel discs; and
   a solid state thermal conductor extending into and thermally integrated with the reactor core, wherein the solid state thermal conductor is arranged to transfer thermal energy generated by the reactor core away from the reactor core;
   wherein the solid state thermal conductor comprises an internal portion extending into the reactor core and an external portion extending away from the reactor core, wherein the internal portion of the solid state thermal conductor comprises a plurality of sheets positioned in between the fuel discs such that the plurality of sheets are parallel and interleave the fuel discs; and
   wherein the plurality of sheets of the internal portion of the solid state thermal conductor comprises a mesh extending within the reactor core, wherein at least part of the mesh is enclosed by the fuel discs.

2. The thermal power reactor as claimed in claim 1, wherein the internal portion and the external portion of the solid state thermal conductor are thermally connected to each other.

3. The thermal power reactor as claimed in claim 1, wherein the internal portion and the external portion are formed from different materials.

4. The thermal power reactor as claimed in claim 1, wherein the internal portion of the solid state thermal conductor comprises graphite and/or tungsten-rhenium.

5. The thermal power reactor as claimed in claim 1, wherein the external portion of the solid state thermal conductor comprises a plurality of layers of graphene.

6. The thermal power reactor as claimed in claim 5, wherein the external portion of the solid state thermal conductor comprises one or more intermediate separating layers that interleave the plurality of layers of graphene.

7. The thermal power reactor as claimed in claim 6, wherein the one or more intermediate separating layers comprise copper.

8. The thermal power reactor as claimed in claim 1, wherein the thermal power reactor comprises a heat conversion unit for converting thermal energy to electricity which is thermally connected to the reactor core via the solid state thermal conductor.

9. The thermal power reactor as claimed in claim 8, wherein the heat conversion unit comprises a solid state heat conversion unit.

10. The thermal power reactor as claimed in claim 9, wherein the thermal power reactor comprises a shield encasing the reactor core, and the solid state heat conversion unit is located at the shield of the reactor core.

11. The thermal power reactor as claimed in claim 8, wherein the heat conversion unit comprises a Stirling engine.

12. The thermal power reactor as claimed in claim 11, wherein an external portion of the solid state thermal conductor extends into the Stirling engine, wherein the external portion of the solid state thermal conductor is arranged to transfer thermal energy to a working fluid of the Stirling engine.

13. The thermal power reactor as claimed in claim 11, wherein the external portion of the solid state thermal conductor comprises graphene, wherein the graphene is wrapped around the Stirling engine.

14. The thermal power reactor as claimed in claim 11, wherein the Stirling engine is remote from the reactor core.

15. The thermal power reactor as claimed in claim 1, wherein the thermal power reactor comprises a shield encasing the reactor core and the solid state thermal conductor extends through the shield.

16. The thermal power reactor as claimed in claim 15, wherein the solid state thermal conductor comprises a non-linear portion that extends through the shield wherein the non-linear portion comprises an S-shaped, a U-shaped bend or a labyrinthine path.

17. A thermal power reactor comprising:
   a reactor core, wherein the reactor core comprises a plurality of fuel discs; and
   a solid state thermal conductor extending into and thermally integrated with the reactor core, wherein the solid state thermal conductor is arranged to transfer thermal energy generated by the reactor core away from the reactor core;
   wherein the solid state thermal conductor comprises an internal portion extending into the reactor core and an external portion extending away from the reactor core, wherein the internal portion of the solid state thermal conductor comprises a plurality of sheets positioned in between the fuel discs such that the plurality of sheets are parallel with and interleave the fuel discs;
   wherein the thermal power reactor comprises a shield encasing the reactor core and the solid state thermal conductor extends through the shield; and
   wherein the solid state thermal conductor comprises a non-linear portion that extends through the shield, wherein the non-linear portion comprises an S-shaped bend, a U-shaped bend or a labyrinthine path.

18. A thermal power reactor comprising:
   a reactor core, wherein the reactor core comprises a plurality of fuel discs; and
   a solid state thermal conductor extending into and thermally integrated with the reactor core, wherein the solid state thermal conductor is arranged to transfer thermal energy generated by the reactor core away from the reactor core;
   wherein the solid state thermal conductor comprises an internal portion extending into the reactor core and an external portion extending away from the reactor core, wherein the internal portion of the solid state thermal conductor comprises a plurality of sheets positioned in between the fuel discs such that the plurality of sheets are parallel with and interleave the fuel discs;
   and wherein the plurality of sheets extend from the internal portion of the solid state thermal conductor into the external portion of the solid state thermal conductor.

* * * * *